J. PLANCK.
Millstone-Drivers.
No. 196,930. Patented Nov. 6, 1877.
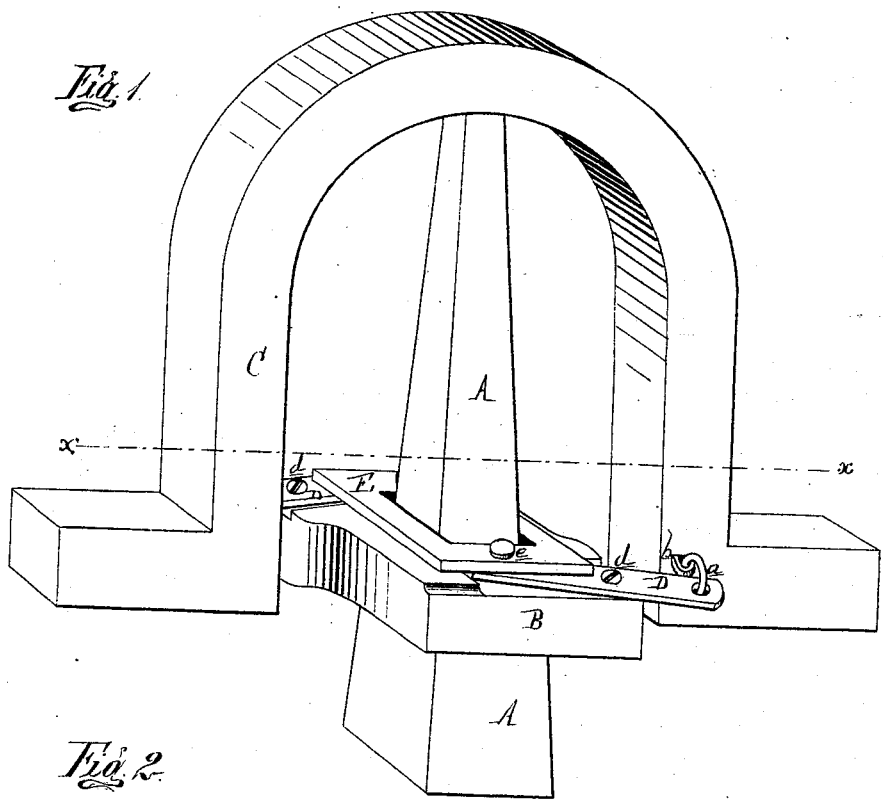
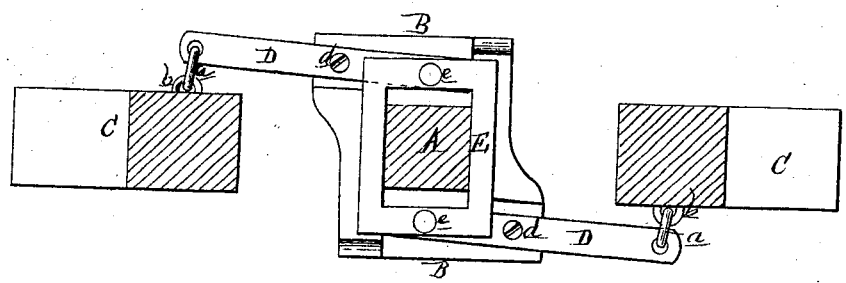
Attest:
Edward Barthel
C. R. Hulett
Inventor:
J. Planck
By Atty
Thos. S. Sprague

UNITED STATES PATENT OFFICE.

JOHN PLANCK, OF CONSTANTINE, MICHIGAN, ASSIGNOR OF ONE-HALF HIS RIGHT TO BENAIAH A. THARP AND JOHN P. HARTZLER, OF SAME PLACE.

IMPROVEMENT IN MILLSTONE-DRIVERS.

Specification forming part of Letters Patent No. 196,930, dated November 6, 1877; application filed July 23, 1877.

*To all whom it may concern:*

Be it known that I, JOHN PLANCK, of Constantine, in the county of St. Joseph and State of Michigan, have invented an Improvement in Millstone-Drivers, of which the following is a specification:

The nature of my present invention relates to an improvement on the driver for which Letters Patent No. 136,863 were issued to me, as assignor to myself and William Patterson, on March 18, 1873, having for its object to provide said driver with equalizing-levers, by means of which the strain upon both ends of the driver will be equally divided upon them, and thus causing it to draw equally upon both ends of the bail.

Figure 1 is a perspective view. Fig. 2 is a sectional plan view, the section being taken along the line $x\ x$.

In the drawing, A represents the cock-head of the spindle, which passes through the eye of the driver B, which latter is rotated thereby, and C is the bail of the runner-stone, poised and stepped on the cock-head, as described in the said Letters Patent.

By referring to the said Letters Patent it will be seen that the ends of the driver are connected with the heels of the bail on alternate sides by means of eyebolts and links.

Unless the connections of one side were exactly equal in length with those of the other side, the shorter arm would draw heavier upon its side of the bail than would the other arm, and thus tend to cock the stone. To avoid trouble from this cause, and to cause both ends of the bail to be subjected to equal draft-tension, I pivot a lever, D, at $d$, to each arm of the driver, the outer end of which is connected, by a link, $a$, to the eyebolt $b$ in the heel of the bail.

Over the cock-head I drop an equalizer, E, resting it upon the inner ends of the levers D D, to each of which it is pivoted at $e$. The opening in the equalizer-frame is large enough to permit it to play freely about the cock-head. The effect of this arrangement is to equalize the tension upon the heels of the bail, in a manner so simple as to be evident without further explanation.

I am aware of the patent granted to D. B. Ritter, September 7, 1869, and hereby disclaim the same; but

What I claim as my invention is—

The combination, with the driver B and bail C of a millstone, of the rectangular equalizing-frame E, the levers D, pivoted to the said driver and equalizing-frame, and the links and bolts $a\ b$, connecting the said levers to the heels of the bail, whereby the bail is rotated by the pulling of the levers upon the same, substantially as described and shown.

JOHN PLANCK.

Witnesses:
SARAH A. REYNOLDS,
LEVI J. REYNOLDS.